United States Patent
Bogdanov (10) Patent No.: US 10,969,258 B2
(45) Date of Patent: Apr. 6, 2021

(54) NON-INVASIVE SENSOR IN A BLUFF BODY OF A VORTEX FLOWMETER

(71) Applicant: Micro Motion, Inc., Boulder, CO (US)

(72) Inventor: Vladimir D. Bogdanov, Chelyabinsk (RU)

(73) Assignee: Micro Motion Inc., Boulder, CO (US)

( * ) Notice: Subject to any disclaimer, the term of this patent is extended or adjusted under 35 U.S.C. 154(b) by 10 days.

(21) Appl. No.: 16/296,526

(22) Filed: Mar. 8, 2019

(65) Prior Publication Data

US 2020/0072647 A1 Mar. 5, 2020

Related U.S. Application Data

(63) Continuation of application No. PCT/RU2018/000572, filed on Aug. 30, 2018.

(51) Int. Cl.
*G01F 1/32* (2006.01)

(52) U.S. Cl.
CPC ............ *G01F 1/3245* (2013.01); *G01F 1/329* (2013.01); *G01F 1/3218* (2013.01)

(58) Field of Classification Search
USPC ...................................... 73/861.22
See application file for complete search history.

(56) References Cited

U.S. PATENT DOCUMENTS

| | | | | |
|---|---|---|---|---|
| 3,587,312 A | * | 6/1971 | McMurtrie | G01F 1/3209 73/861.22 |
| 3,733,897 A | * | 5/1973 | Herzl | G01F 1/3236 73/861.22 |
| 3,878,715 A | * | 4/1975 | Kobayashi | G01F 1/3245 73/861.22 |
| 4,201,084 A | * | 5/1980 | Ito | G01F 1/3263 73/861.22 |
| 4,220,046 A | * | 9/1980 | Sqourakes | G01F 1/3209 73/861.22 |
| 4,248,098 A | * | 2/1981 | Sawayama | G01F 1/3263 73/861.24 |
| 4,322,982 A | * | 4/1982 | Muller | G01F 1/58 73/861.12 |
| 4,326,422 A | * | 4/1982 | Kobayashi | G01F 1/3218 73/861.22 |
| 4,448,081 A | | 5/1984 | Kolitsch et al. | |
| 4,453,416 A | * | 6/1984 | Knudsen | G01F 1/3263 73/861.22 |
| 4,475,405 A | | 10/1984 | Corpron et al. | |
| 4,523,477 A | * | 6/1985 | Miller | G01F 1/3209 73/861.02 |

(Continued)

OTHER PUBLICATIONS

International Search Report and Written Opinion dated May 30, 2019 for International Patent Application No. PCT/RU2018/000572, 7 pages.

*Primary Examiner* — Harshad R Patel
(74) *Attorney, Agent, or Firm* — Christopher R. Christensen; Kelly, Holt & Christensen PLLC (57) ABSTRACT

A vortex flowmeter includes a flow tube configured to receive a flow of process fluid in a first direction. A bluff body is disposed within the flow tube between a first end and a second end. The bluff body is configured to generate vortices in the flow of process fluid. A plurality of sensors are disposed within the bluff body configured to detect deformations within the bluff body resulting from the vortices acting on the bluff body.

15 Claims, 12 Drawing Sheets

(56) References Cited

U.S. PATENT DOCUMENTS

| | | | | |
|---|---|---|---|---|
| 4,550,614 A * | 11/1985 | Herzl | G01F 1/3227 | 137/804 |
| 4,559,832 A * | 12/1985 | Burlage | G01F 1/3254 | 310/338 |
| 4,565,098 A * | 1/1986 | Herzl | G01F 1/3263 | 73/197 |
| 4,592,240 A * | 6/1986 | McHale | G01F 1/58 | 73/861.22 |
| 4,862,750 A * | 9/1989 | Nice | G01F 1/3263 | 73/861.24 |
| 4,922,759 A * | 5/1990 | Steiner | G01F 1/3218 | 73/861.22 |
| 5,463,904 A * | 11/1995 | Kalinoski | G01F 1/3209 | 73/719 |
| 5,627,322 A * | 5/1997 | Osterloh | G01F 1/3263 | 73/861.21 |
| 5,869,772 A * | 2/1999 | Storer | G01F 1/3263 | 73/861.22 |
| 5,913,247 A * | 6/1999 | Steuer | G01F 1/3218 | 73/861.22 |
| 5,939,643 A * | 8/1999 | Oertel | G01F 1/3218 | 73/861.22 |
| 6,058,785 A * | 5/2000 | Kalinoski | G01F 1/3263 | 324/684 |
| 6,220,103 B1 * | 4/2001 | Miller | G01F 1/3263 | 73/861.22 |
| 6,257,071 B1 * | 7/2001 | Dessert | G01F 1/3254 | 73/861.22 |
| 6,298,734 B1 * | 10/2001 | Storer | G01F 1/3218 | 73/861.22 |
| 6,752,027 B1 * | 6/2004 | Kalinoski | G01F 1/3245 | 73/861.22 |
| 6,904,810 B2 * | 6/2005 | Oomura | G01F 1/3209 | 73/861.22 |
| 7,058,549 B2 * | 6/2006 | Gysling | G01F 1/7082 | 702/189 |
| 8,234,931 B2 * | 8/2012 | Cheng | G01F 1/3218 | 73/861.24 |
| 2003/0061887 A1 * | 4/2003 | Koudal | G01F 1/3218 | 73/861.22 |
| 2004/0244499 A1 * | 12/2004 | Keita | G01F 1/88 | 73/861.22 |
| 2012/0192657 A1 * | 8/2012 | Gossner | G01F 1/329 | 73/861.22 |
| 2012/0325014 A1 * | 12/2012 | Pulley | G01F 1/3254 | 73/861.22 |
| 2013/0103325 A1 * | 4/2013 | Gossner | G01F 1/3209 | 702/47 |
| 2015/0040684 A1 * | 2/2015 | Newton | G01F 1/3209 | 73/861.22 |
| 2016/0231162 A1 * | 8/2016 | Schmid | G01F 1/329 | |
| 2018/0023985 A1 * | 1/2018 | Bogdanov | G01F 1/329 | 73/861.24 |

* cited by examiner

| V | A1p-p avg | A2p-p avg | Cable vortex frequency | Sensor vortex frequency |
|---|---|---|---|---|
| ft/s | mV | mV | Hz | Hz |
| 25.4 | 7.8 | 7.6 | 105.60 | 105.59 |
| 19.9 | 3.9 | 3.8 | 82.40 | 83.01 |
| 14.5 | 1.4 | 1.3 | 60.60 | 59.57 |
| 9.1 | 0.39 | 0.45 | 38.09 | 37.60 |
| 5.4 | 0.23 | 0.44 | 22.46 | 22.54 |

NON-INVASIVE SENSOR IN A BLUFF BODY OF A VORTEX FLOWMETER

BACKGROUND

Vortex flowmeters are used in the industrial process control field for measuring a flow rate of a fluid. Vortex flowmeters are typically inserted in a flow pipe or conduit that carries the fluid to be measured. Industry applications include petroleum, chemical, pulp and paper, mining and materials, oil and gas, for example.

The operating principle of a vortex flowmeter is based on a phenomenon of vortex shedding known as the von Karman effect. As fluid passes a shedding bar or "bluff body", it separates and generates small eddies or vortices that are shed alternately along and behind each side of the bluff body. These vortices cause areas of fluctuating flow and pressure that are detected by a sensor. Various different types of sensors are currently in use for detecting such vortices including force sensors, piezoelectric dynamic pressure sensors, or differential pressure sensors, for example. The frequency of vortex generation is essentially proportional to fluid velocity.

The vortex sensors currently used to sense vortices in vortex flowmeters are generally relatively complex and costly. Further, such sensors require additional fasteners and a robust seal since the sensor or some other suitable structure, must be inserted into the flow tube in order to interact with the vortices for detection. Accordingly, the process fluid is brought into direct contact with such structure and the process intrusion itself must be sealed carefully in order to ensure that process fluid does not leak.

SUMMARY

A vortex flowmeter includes a flow tube configured to receive a flow of process fluid in a first direction. A bluff body is disposed within the flow tube between a first end and a second end. The bluff body is configured to generate vortices in the flow of process fluid. A plurality of sensors are disposed within the bluff body configured to detect deformations within the bluff body resulting from the vortices acting on the bluff body.

DETAILED DESCRIPTION

Figure 1:
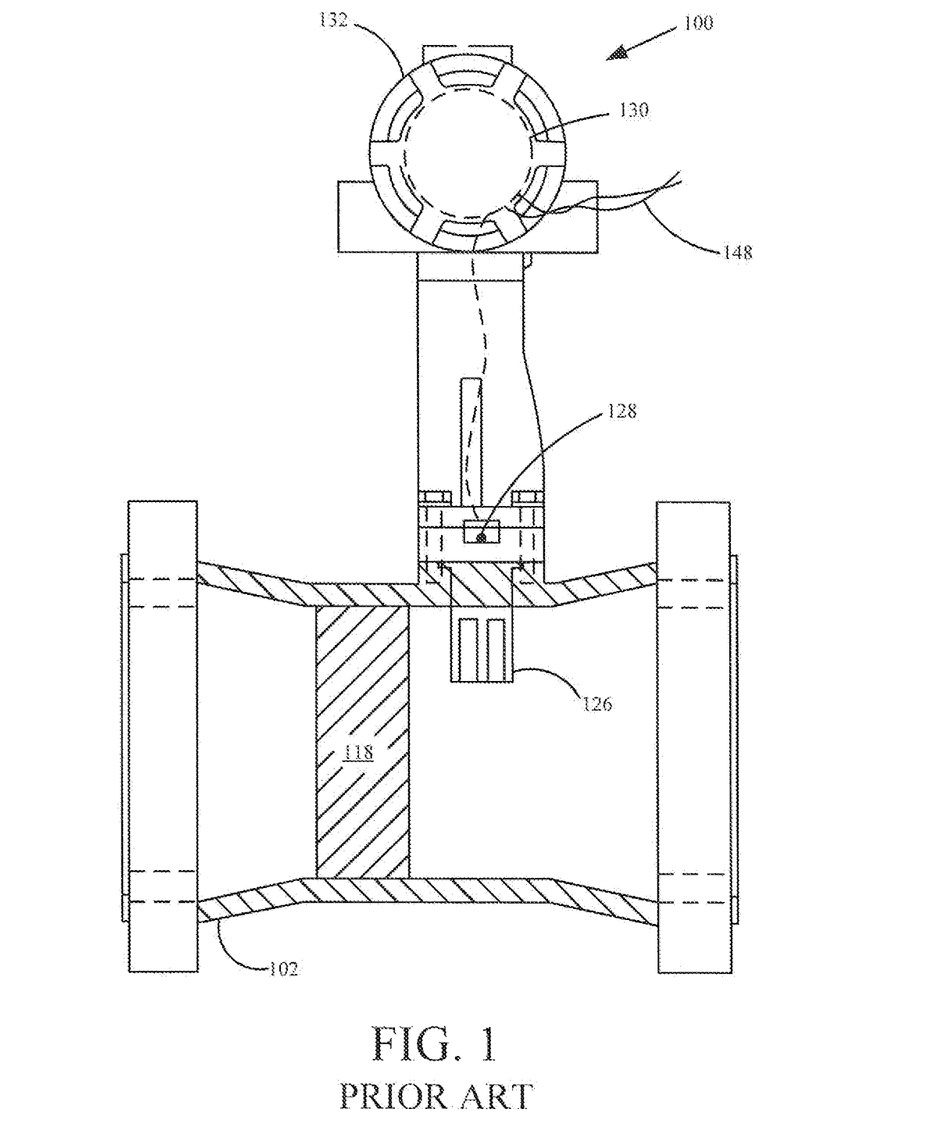
FIG. 1 is a diagrammatic view of a flowmeter in accordance with the prior art.

FIG. 1 is a diagrammatic view of a flowmeter in accordance with the prior art. Flowmeter 100 includes a flow tube 102, a shedder bar 118, a sensing apparatus 126 connected to a sensor 128, electronics 130 within a housing 132 and output leads 148. In operation, flowmeter 100 receives a fluid and is configured to calculate a flow rate of the fluid based on generated vortices.

For example, flow tube 102 is attached to a pair of flanges that allow flowmeter 100 to be mounted to corresponding flanges on a pipe. Each of the flanges may include mounting holes (illustrated in phantom), that allow each flange to be mounted to the corresponding flange of a pipe. Once mounted, flowmeter 100 receives a flow of fluid from the pipe which can include a liquid, gas, or a combination thereof (such as saturated steam).

As fluid flows through flow tube 102, it contacts shedder bar 118 extending from a top portion of flow tube 102 to a bottom portion thereof. Typically, shedder bar 118 is positioned in the center of flow tube 102. Further, if flow tube 102 were viewed along its axis, shedder bar 118 would typically be positioned in the center of flow tube 102 extending from the center of the top-most portion of flow tube 102 to the center of the bottom-most portion of flow tube 102. However, flowmeters can be practiced with shedding bars that are positioned in other orientations as well as shedding bars that do not completely span the entire inner diameter of the flow tube.

Regardless, as a fluid flows past shedder bar 118, vortices are generated within the fluid flow generally referred to as Karman vortices. Generally, Karman vortices occur due to shedder bar 118 slowing down the fluid flow leading to a reduced pressure allowing for periodic pressure pulsations (Karman vortices) within the fluid flow. Karman vortices are subsequently formed on different sides of shedder bar 118 and the resulting pressure of the Karman vortices alternately contact opposite sides of shedder bar 118. Additionally, once formed, the vortices contact sensing apparatus 126 causing subtle movements and vibrations in apparatus 126.

These movements of apparatus 126 can be transduced or otherwise sensed by sensor 128 that is electrically coupled to electronics 120 within housing 132. Generated sensor signals, from sensor 128, can subsequently be provided to electronics 130 and used to deduce a flow rate for the fluid. A calculated flow rate may then be provided over output leads 148 to another suitable device, such as a process controller or valve controller. As a result, a flowmeter will typically comprise a flow tube assembly and an electronics assembly which, when combined, may be referred to as a flow transmitter.

As can be seen in FIG. 1, previous flowmeter designs generally include a sensing apparatus 126 disposed within flow tube 102 proximate shedder bar 118 in order to detect or otherwise sense Karman vortices. However, due to the inclusion of sensing apparatus 126, flowmeter 100 must be carefully sealed so that fluid does not leak out of flowmeter 100. Additionally, in this configuration, a received flow of liquid interacts directly with sensing apparatus 126 which, over time, can lead to damage or wear on sensing apparatus 126.

Embodiments of the present invention generally remove sensing apparatus 126 and incorporate sensors, within a bluff body, configured to detect a pressure on sides of the bluff body resulting from the formed vortices as will be discussed further in FIG. 2.

Once formed, alternating pressure pulsations (Karman vortices) act on differing sides of the bluff body causing a deformation within the bluff body that is transferred to the sensors. This deformation can, in turn, be detected by the sensors and provided as electrical signals to measurement circuitry within a vortex flowmeter and used to determine a fluid flow rate. Additionally, in this configuration, because sensors are within a bluff body, the vortex flowmeter can measure a flow rate of a liquid with a high liquid pressure and/or in an environment with a high level of vibration as there are no separating membranes and gaskets.

Figure 2A:
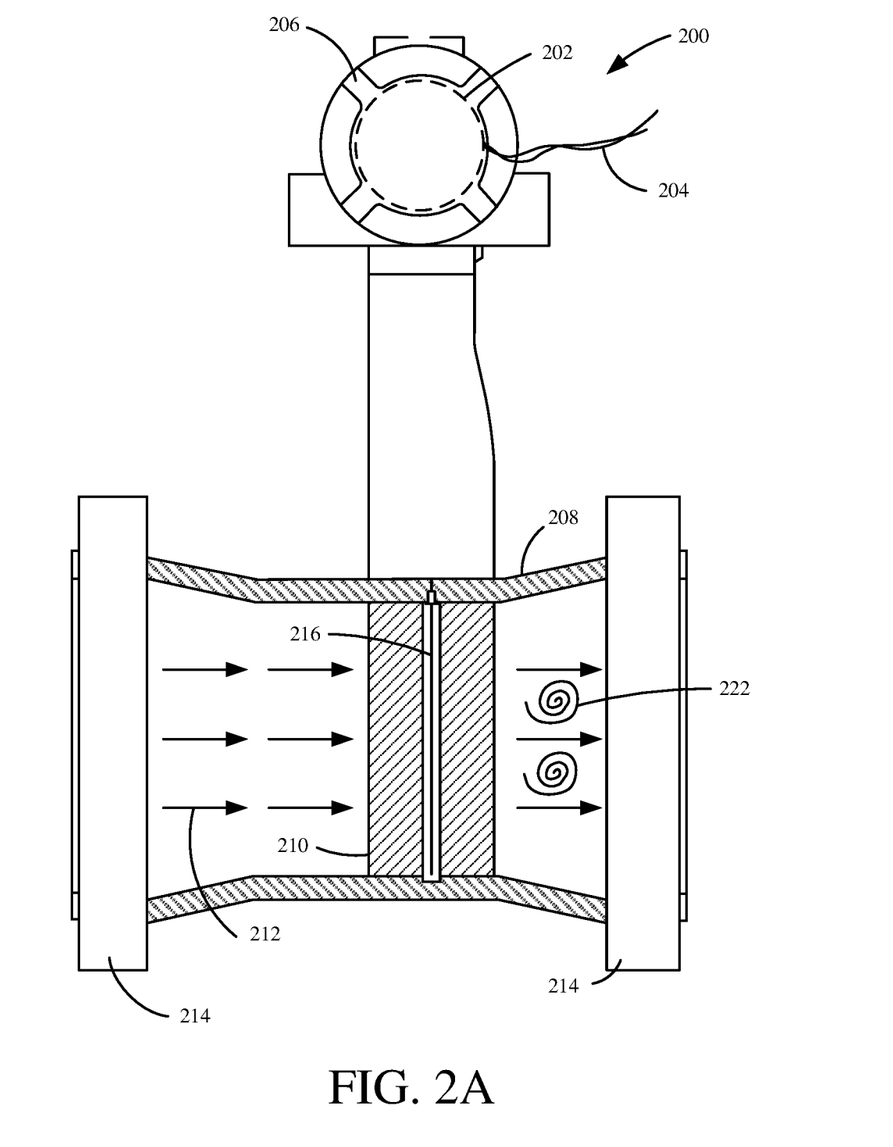
FIGS. 2A-2C are diagrammatic views of a vortex flowmeter with sensors located within a bluff body in accordance with embodiments of the present invention.
Figure 2B:
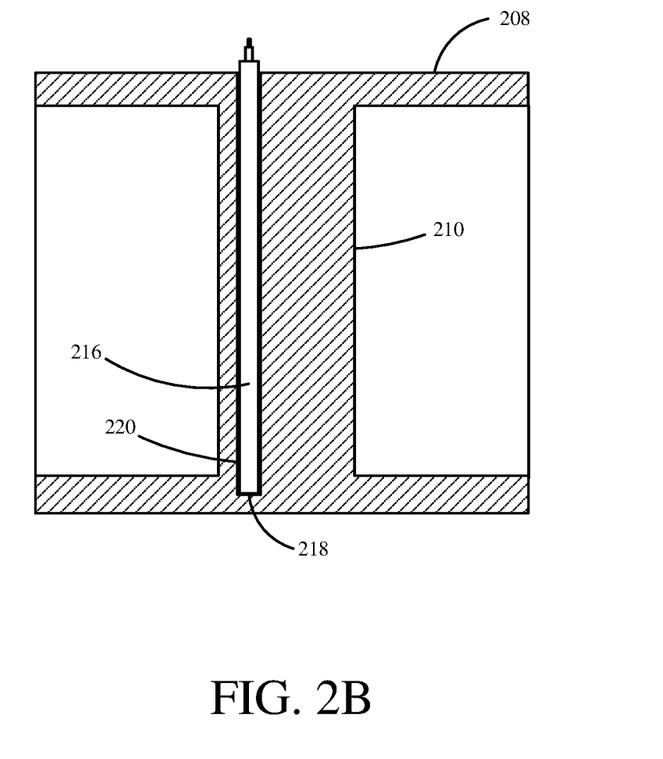
Figure 2C:
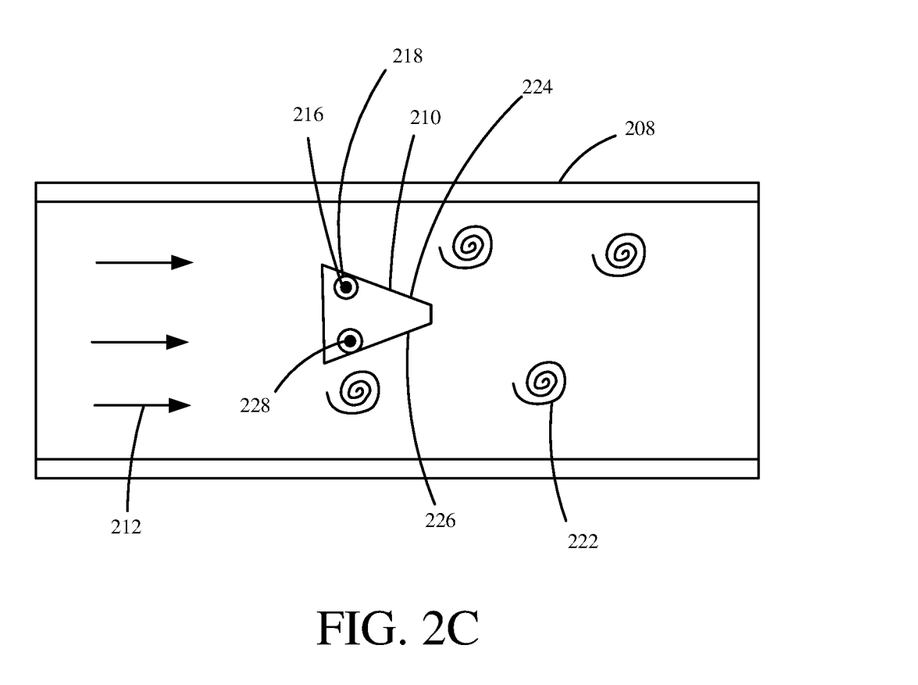

FIGS. 2A-2C are diagrammatic views of a vortex flowmeter with sensors located within a bluff body in accordance with embodiments of the present invention. As illustratively shown in FIG. 2A, vortex flowmeter 200 illustratively includes a flow tube 208 with flanges 214, flowmeter electronics 202 within a housing 206, leads 204, and a sensor 216 disposed within a bluff body 210. In one example, sensor 216 is encapsulated by a sealing material 220 within a hole 218 of bluff body 210 as is illustratively shown in FIG. 2B. Sealing material 220 may include an epoxy compound, glass, cement, or any material that is an electric insulator with chemical stability and high-fluidity. While sensor 216 is illustratively in the form of a piezoelectric cable, it is to be understood that other sensors may be used to detect deformations within bluff body 210.

In operation, flow tube 208 is coupled to a pipe via flanges 214 and receives a flow of process fluid generally in the direction of arrow 212. Now turning to FIG. 2C, once the flow of process fluid reaches bluff body 210, Karman vortices 222 are formed from opposite sides 224 and 226 of bluff body 210, and, in operation, a pressure of vortices 222 alternately strikes sides 224 and 226 of bluff body 210 leading to deformations within bluff body 210. The frequency of vortices 222 depends linearly on the flow velocity. Therefore, based on the frequency of vortices 222 acting on alternating sides 224 and 226 of bluff body 210, a flow velocity can be calculated using flowmeter electronics 202. Additionally, the amplitude of vortices 222 depends on the density of the fluid and is associated with flow velocity.

In accordance with embodiments of the present invention, sensors 216 and 228, disposed within bluff body 210, are connected in parallel by pairs for each side 224 and 226 of bluff body 210, in one embodiment, and can detect deformations of bluff body 210 resulting from a pressure of vortices 222 alternately contacting sides 224 and 226 of bluff body 210. In this configuration, a frequency of the deformations within bluff body 210, corresponding to the frequency of vortices 222 alternately contacting the sides 224 and 226 of bluff body 210, can be used to calculate a flow rate for the flow of process fluid.

For example, sensor signals generated from sensors 216 and 228, within bluff body 210, can be provided to flowmeter electronics 202 and used to determine a flow rate as will be discussed in FIGS. 3A-3C. Flowmeter electronics 202 can perform a frequency analysis of the received signals to detect a frequency in which a pressure of vortices 222 acts on bluff body 210. In one example, the frequency analysis can include a Fast Fourier Transform (FFT). Based on the frequency of pressure pulsations 222 acting on bluff body 210, leading to deformations within bluff body 210, a flow rate can be calculated for the flow of process fluid, and, subsequently, communicated over leads 204 to another device such as a process controller.

Figure 3A:
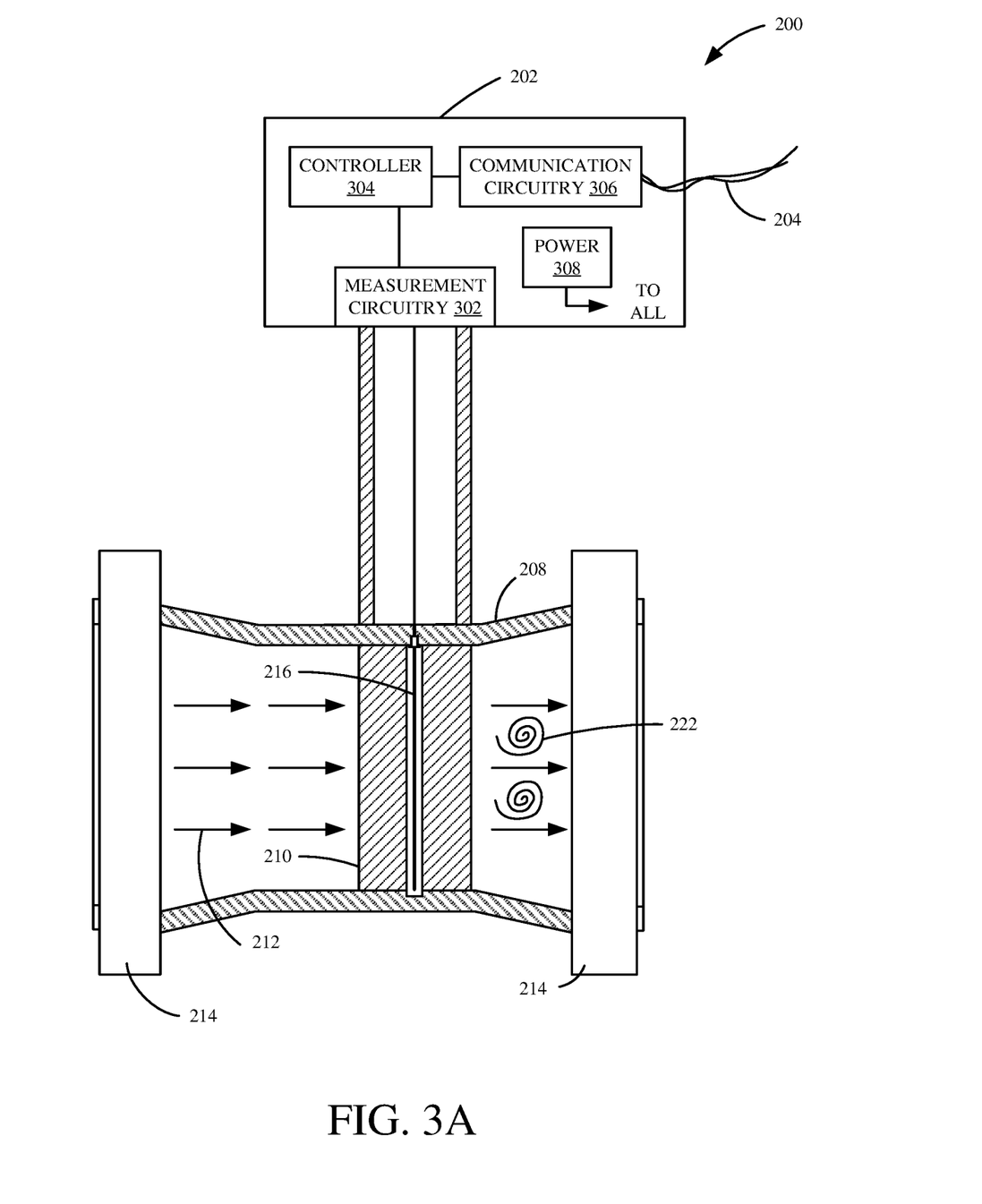
FIG. 3A-3C are diagrammatic views of a vortex flowmeter with sensors coupled to flowmeter electronics in accordance with embodiments of the present invention.
Figure 3B:
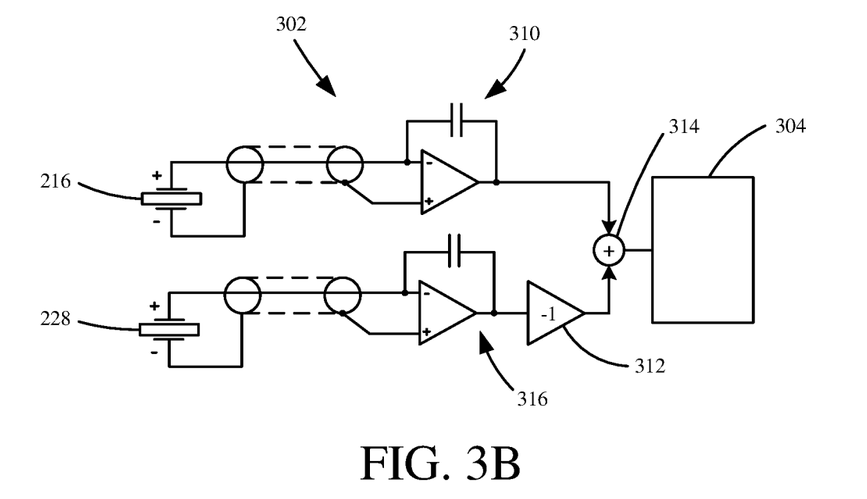
Figure 3C:
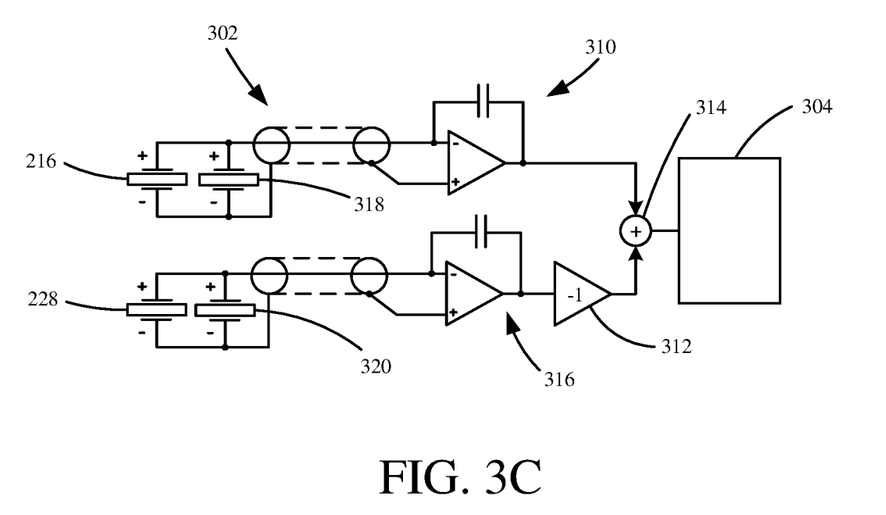

FIG. 3A-3C are diagrammatic views of a vortex flowmeter with sensors coupled to flowmeter electronics in accordance with embodiments of the present invention. As illustratively shown in FIG. 3A, vortex flowmeter 200 is similar to the vortex flowmeter in FIG. 2A, and, as such, includes components numbered similarly. However, as illustratively shown in FIG. 3A, flowmeter electronics 202 include measurement circuitry 302 connected to sensor 216, controller 304, communication circuitry 306 and power module 308.

Turning to FIG. 3B, measurement circuitry 302 illustratively includes one or more amplifiers 310 and 316 configured to amplify signals received from sensors 216 and 228, respectively, an inverter 312 and a signal adder 314. However, it is contemplated that measurement circuitry 302 may have additional or fewer components as well. Amplifiers 310 and 316 can include differential charge or differential voltage amplifiers. In one example, a sensor signal is generated by sensor 216 and received by amplifier 310 and, upon being amplified, is output to signal adder 314 within measurement; circuitry 302. Additionally, in this example, a sensor signal generated by sensor 228 is received by amplifier 316 and inverter 312, respectively. An output from inverter 312 can be provided to signal adder 314 which, upon receiving both outputs, combines the received outputs and subsequently provide an adder output to controller 304, Additionally, it is expressly contemplated that any number of sensors can be used as will be discussed later with respect to FIG. 5. The various sensors can be used and connected in parallel EIS illustratively shown in FIG. 3B. In this example, sensor 216 is connected in parallel with sensor 318, and Sensor 228 is connected in parallel with sensor 390. Furthermore, measurement circuitry 302 can also include any suitable analog-to-digital converters as well.

Controller 304, in one example, includes a microprocessor that is configured, through hardware, software, or a combination thereof, to analyze the signals provided by measurement circuitry 302 and generate a process fluid flow rate based upon the received signals. As set forth above, controller 304 may perform a Fast Fourier Transform of the signals in order to identify a deformation frequency corresponding to a vortex frequency. Additionally, in other examples, controller 304 can also identify frequencies of other artifacts that may cause noise or error. Upon calculating a fluid flow rate, controller 304 can provide the fluid flow rate over a process communication loop or segment.

For example, controller 304 is coupled to communication circuitry 306 which can interact with a process communication loop or segment using any suitable process communication protocol, such as the Highway Addressable Report Transducer (HART®), FOUDATION™ Fieldbus, or others. Additionally, in embodiments where the vortex flowmeter communicates wirelessly, communication circuitry 306 may support a wireless process communication protocol, such as that in accordance with IEC 62591 (WirelessHART).

Flowmeter electronics 202 also include power module 308 that provides suitable power to any or all components of electronics 202. Additionally, in embodiments where vortex flowmeter 200 is coupled to a wired process communication loop or segment via leads 204, power module 308 may receive and suitably condition electrical power from the wired process communication loop in order to provide operating power to the components of flowmeter electronics 202. Accordingly, some embodiments of the present invention may be wholly powered by the process communication loop or segment to which they are coupled. In other embodiments, when vortex flowmeter 200 is not coupled to a wired process communication loop or segment, power module 308 may include a suitable battery or energy source to provide electrical power to flowmeter electronics 202 for a suitable period of time.

Figure 4:
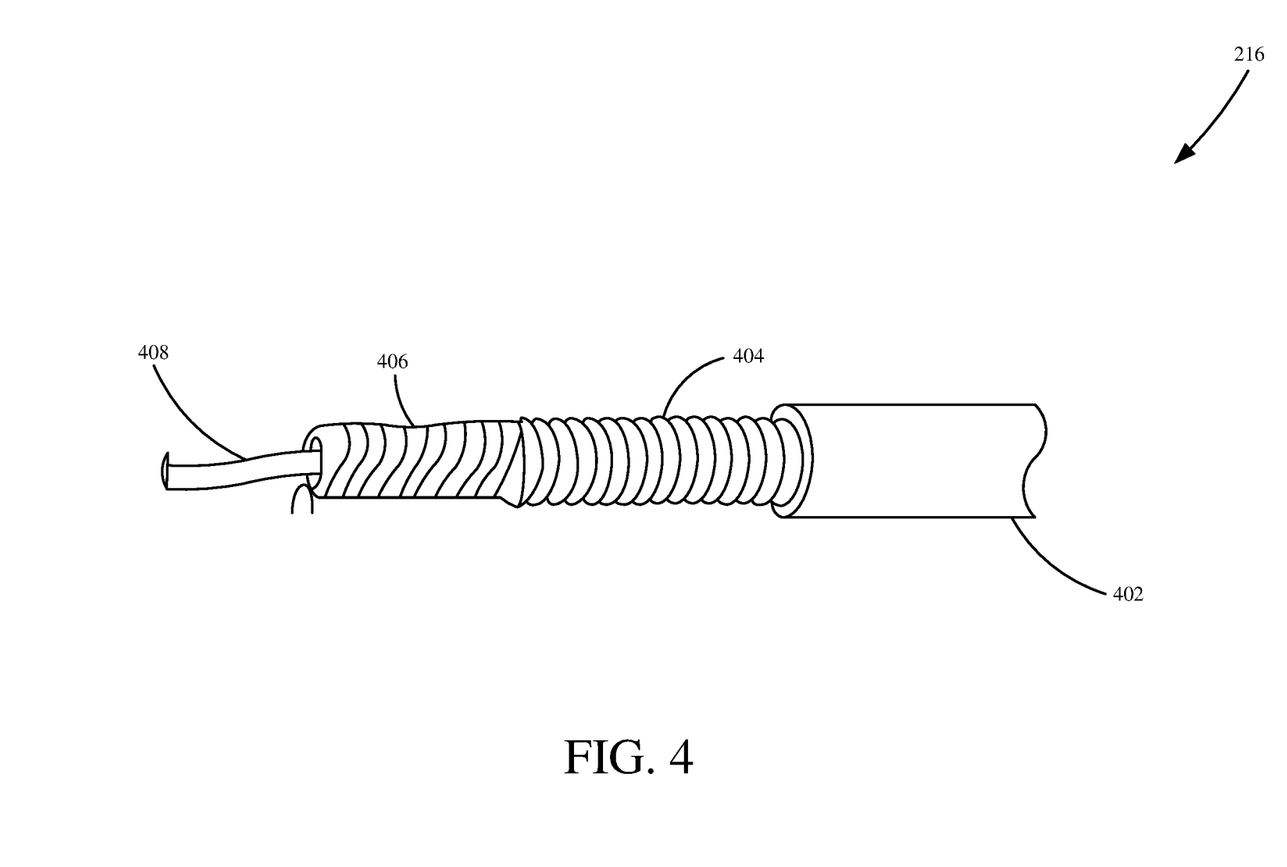
FIG. 4 is a diagrammatic view of a sensor in accordance with an embodiment of the present invention.

FIG. 4 is a diagrammatic view of a sensor in accordance with an embodiment of the present invention. As illustratively shown, sensor 216 includes a piezoelectric cable that includes a polyethylene outer jacket 402, a copper braid 404 (outer electrode), a polyvinylidene fluoride (PVDF) piezo film tape 406 and a standard center core 408 (inner electrode). In one example, sensor 216 can include a piezo copolymer coaxial cable supplied by Measurement Specialties, Inc., a TE Connectivity Company. In one example, sensor 216 has an outside diameter of 2.69 mm, a capacitance at 1 kHz of 950 pF/m, a weight of 14.5 kg/km, a resistance of shield (DC) of 47 Ω/km, a tan delta (dissipation factor) of 0.016 at 1 kHz (1 m), a hydrostatic piezo coefficient (dh) of 20 pC/N and a resistance of center core (DC) of 31 Ω/km. In operation, PVDF piezo film tape 406 is configured to deform in response to the deformation of bluff body 210 and, as a result, generate an electrical signal for measurement circuitry 302 indicative of the deformation. Over time, received electrical signals can indicate a frequency of formed vortices acting on bluff body 210, which corresponds linearly to a flow rate. As such, a flow rate can be calculated for a flow of process fluid within vortex flowmeter 200 based on the determined frequency.

Figure 5:
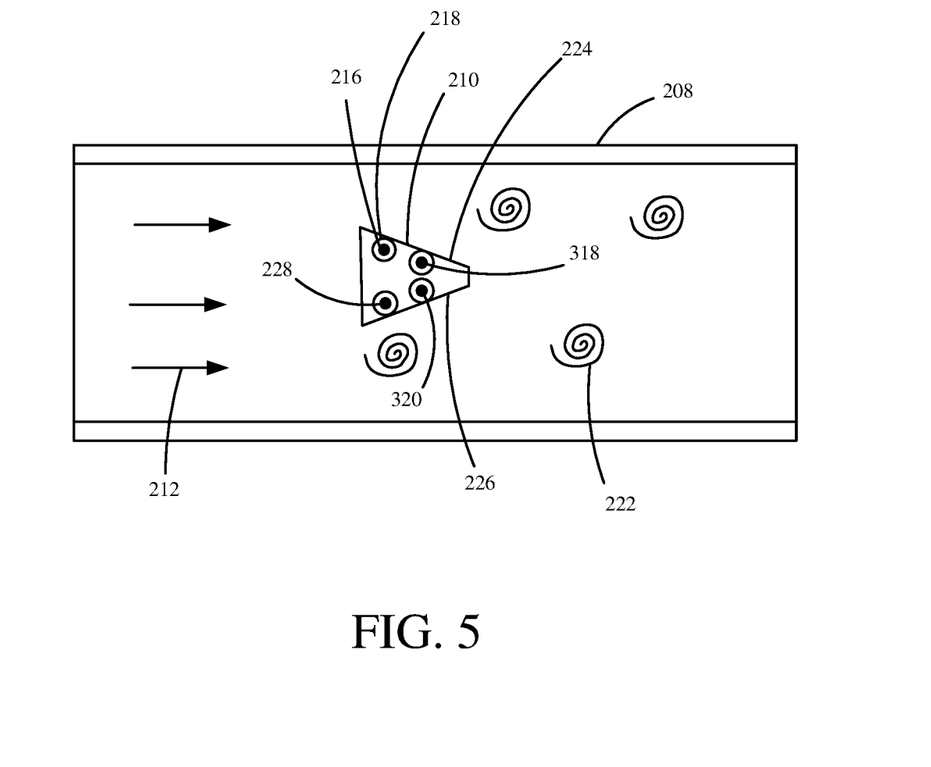
FIG. 5 is a diagrammatic view of a bluff body with multiple sensors in accordance with an embodiment of the present invention.

FIG. 5 is a diagrammatic view of a bluff body with multiple sensors in accordance with an embodiment of the present invention. As illustratively shown, sensors 216, 228, 318 and 320 are located within holes 218 of bluff body 210. As a result, interactions between vortices 222 and sides 224 and 226 of bluff body 210 can be closely monitored. Additionally, it is contemplated that bluff body 210 may incorporate a wide variety of different shapes and sizes in which embodiments of the present invention may be used.

Figure 6A:
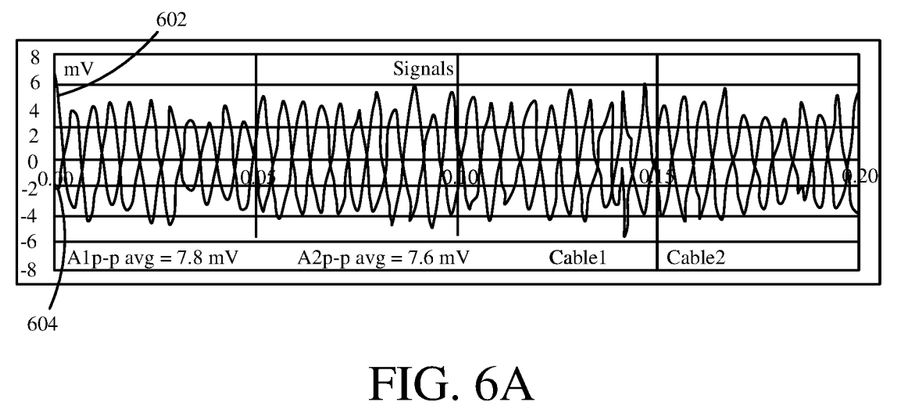
FIGS. 6A and 6B are signal graphs of a vortex flowmeter in accordance with an embodiment of the present invention.
Figure 6B:
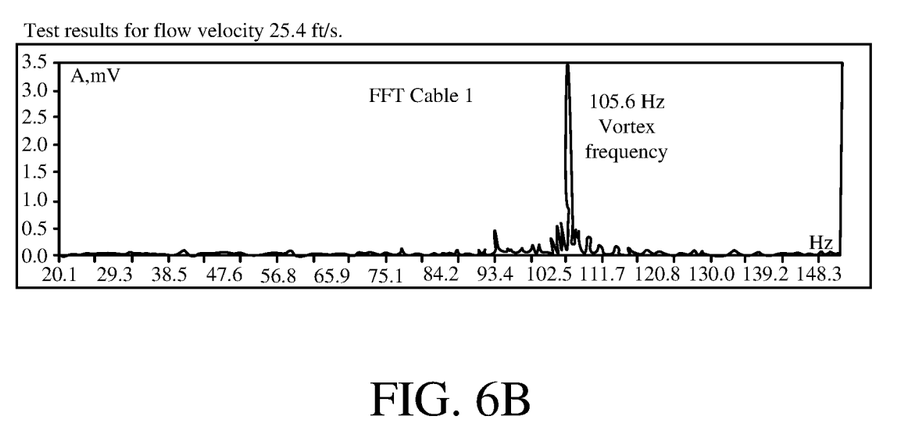

FIGS. 6A and 6B are signal graphs of a vortex flowmeter in accordance with an embodiment of the present invention. Sensor signals were obtained for sensors 216 in which a flow velocity of 25.4 ft/s was used through vortex flow tube 200. As illustratively shown in FIG. 6A, output voltages for sensors 216 (y-axis) were measured using a digital oscilloscope over a 0.20 second timeframe (x-axis). Additionally, sensor signals 602 generated from a first sensor were plotted alongside sensor signals 604 generated from a second sensor. Based on the received output voltages from sensors 216, a frequency of vortices was determined using a Fast Fourier Transform (FFT). As shown in FIG. 6B, for sensor signals 602 received from the first sensor, a frequency peak, corresponding to a vortex frequency, is shown at 105.6 Hz.

Figure 7A:
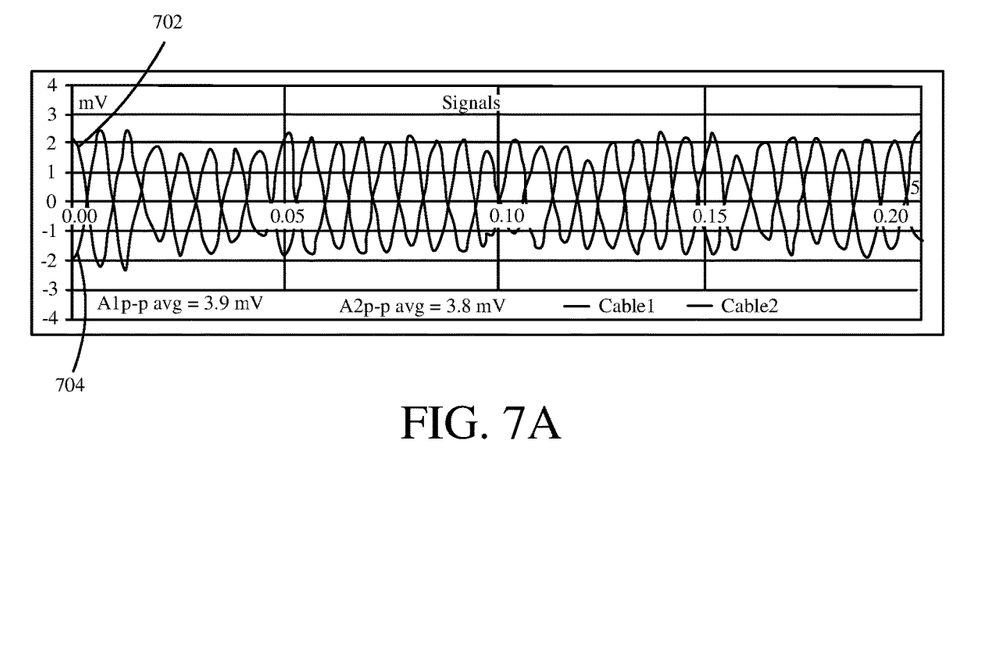
FIGS. 7A and 7B are a similar set of graphs as FIGS. 6A and 6B for a lower fluid flow rate.
Figure 7B:
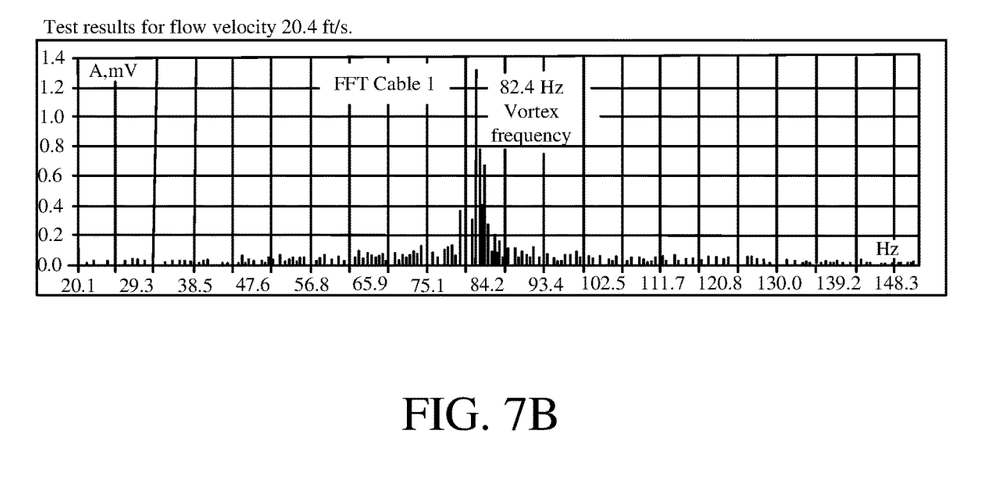

FIGS. 7A and 7B are a similar set of graphs as FIGS. 6A and 6B for a lower fluid flow rate. For the testing conducted in FIGS. 7A and 7B, a flow velocity of 20.0 ft/s was used through vortex flow tube 200. Similarly, sensor signals 702 were received from a first sensor and plotted alongside sensor signals 704 received from a second sensor over 0.20 seconds. Based on the received signals, a frequency peak, corresponding to a vortex frequency, is shown at 82.4 Hz.

Figure 8A:
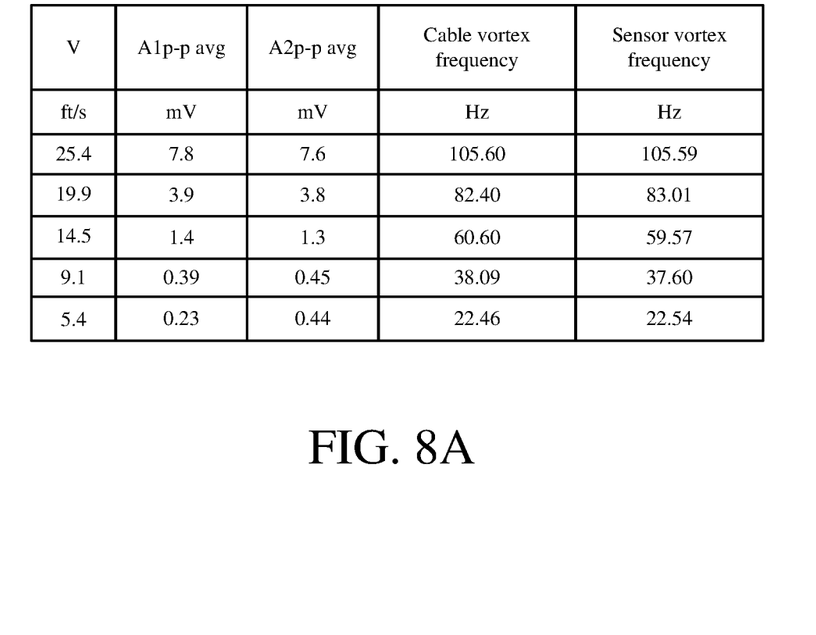
FIG. 8A shows a vortex frequency test result measurement and vortex frequency calculations.

FIG. 8A shows a vortex frequency test result measurement and vortex frequency calculations. As illustratively shown, tests were conducted using a variety of flow velocities through vortex flow tube 200. This includes 25.4 ft/s (as illustratively shown in FIGS. 6A and 6B), 20.0 ft/s (as illustratively shown in FIGS. 7A and 7B), 14.5 ft/s, 9.1 ft/s and 5.4 ft/s. For each flow velocity, sensor signals were collected and used to determine a vortex frequency. As shown, a vortex frequency of 105.6 Hz, 82.40 Hz, 60.60 Hz, 38.09 Hz and 22.46 Hz was calculated for each flow velocity respectively.

Figure 8B:
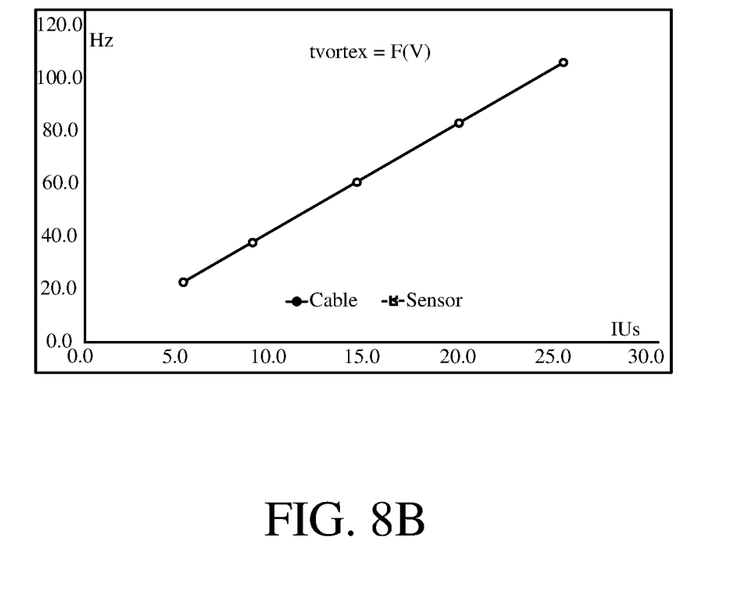
FIG. 8B shows a graph of vortex frequency vs. flow rate.

These frequencies were then compared, and plotted against, vortex frequencies determined using sensing apparatus 126 of flowmeter 100 shown in FIG. 1. This is illustrated in FIG. 8B. As shown, vortex frequencies were similar for sensors 216 within bluff body 210 compared to those obtained from external sensing apparatus 126 in FIG. 1. Therefore, by removing external sensing apparatus 126, accurate measurements were able to be obtained in which a risk of fluid leakage was eliminated and a flow rate with a high liquid pressure was able to be used. Additionally, because sensors 216 are within bluff body 210, vortex flowmeter 200 could be used in an environment with which there is a high level of vibration as there are no separating membranes and gaskets.

Figure 9:
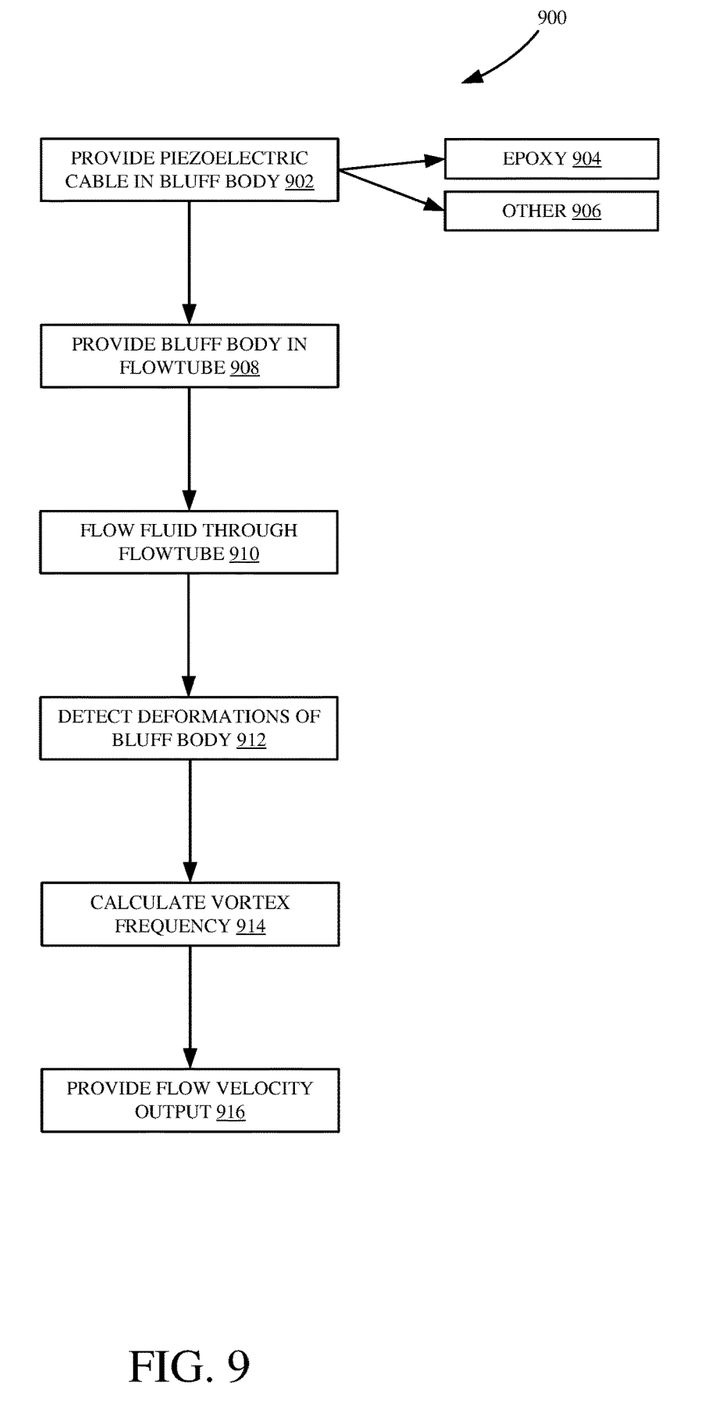
FIG. 9 is a flow diagram of a method of generating a flow velocity output in accordance with an embodiment of the present invention.

FIG. 9 is a flow diagram of a method of generating a flow velocity output in accordance with an embodiment of the present invention. While method 900 includes piezoelectric cables as sensors, it is to be understood that other sensors may be used to detect a frequency of vortices interacting with a bluff body. Method 900 begins at block 902 where piezoelectric cables are provided within a bluff body. While any number of piezoelectric cables can be used, it is contemplated that, in a preferred embodiment, at least multiples of two are used in order to detect an interaction between formed vortices and a corresponding side of a bluff body. Additionally, the piezoelectric cables can be encapsulated by epoxy, as indicated by block 904, within the bluff body, or any other material as indicated by block 906.

Method 900 then turns to block 908 where the bluff body with the piezoelectric cables is provided within a flow tube. Upon providing the bluff body within the flow tube, method 900 proceeds to block 910 where a flow of process fluid is provided through the flow tube. As the process fluid flows through the flow tube, the bluff body creates Karman vortices that interact with, and subsequently cause, deformations within the bluff body. These deformations are then detected by the piezoelectric cables as indicated by block 912. Based on the detected deformations, a vortex frequency is determined as indicated by block 914. In one example, the vortex frequency can be determined using a Fast Fourier Transform, however, other ways are contemplated as well.

Upon determining a vortex frequency, a flow rate can be calculated, and output, as indicated by block 916. In one example, a controller can receive the vortex frequency and calculate the fluid rate based on a linear relationship between a vortex frequency and flow rate. The flow rate can then be provided to another device or communicated over a process communication loop.

Although the present invention has been described with reference to preferred embodiments, workers skilled in the art will recognize that changes may be made in form and detail without departing from the spirit and scope of the invention. For example, while embodiments of the present invention have generally been described with respect to piezoelectric cable sensors, such sensors are merely examples of sensors with suitable sensing abilities to externally detect impingement of vortices on the flow tube. Thus, other types of sensors, either now known or later developed may be able to be used in accordance with embodiments of the present invention.

What is claimed is:
1. A vortex flowmeter comprising:
   a flow tube configured to receive a flow of process fluid in a first direction;

a bluff body, disposed within the flow tube between a first end and a second end, configured to generate vortices in the flow of process fluid;

a first pair of sensors comprising a first pair of piezoelectric cables disposed within holes in the bluff body proximate a first side of the bluff body and spaced apart along the first side, the first pair of sensors configured to detect deformations within the bluff body resulting from vortices acting on the first side of the bluff body; and a second pair of sensors comprising a second pair of piezoelectric cables disposed within holes in the bluff body proximate a second side of the bluff body and spaced apart along the second side, the second pair of sensors configured to detect deformations within the bluff body resulting from vortices acting on the second side of the bluff body.

2. The vortex flowmeter of claim 1, wherein the first side and the second side are on opposite sides of the bluff body.

3. The vortex flowmeter of claim 1, wherein the first pair of piezoelectric cables disposed on the first side are connected in parallel with each other and the second pair of piezoelectric cables on the second side are connected in parallel with each other.

4. The vortex flowmeter of claim 1, wherein the first and second pairs of piezoelectric cables are encapsulated by a sealing material within the holes in the bluff body.

5. The vortex flowmeter of claim 4, wherein the sealing material comprises an epoxy compound.

6. The vortex flowmeter of claim 4, wherein the sealing material comprises a cement compound.

7. The vortex flowmeter of claim 1, further comprising:
flowmeter electronics coupled to the first and second pairs of sensors and configured to generate a process fluid flow output based on a frequency of the deformations within the bluff body resulting from the vortices acting on the bluff body.

8. The vortex flowmeter of claim 7, wherein the flowmeter electronics are configured to perform a frequency analysis on received signals, generated by the first and second pairs of sensors to detect the frequency of the deformations within the bluff body.

9. The vortex flowmeter of claim 8, wherein the frequency analysis is a Fast Fourier Transform (FFT).

10. The vortex flowmeter of claim 8, wherein the flowmeter electronics comprise:
a first amplifier configured to amplify a first received sensor signal from the first pair of sensors and generate a first amplifier output;
a second amplifier configured to amplify a second received sensor signal from the second pair of sensors, located within the bluff body and generate a second amplifier output;
an inverter configured to receive and invert the second amplifier output and generate an inverter output; and
a signal adder configured to receive the first amplifier output and the inverter output and generate an adder output that is provided to a controller configure to perform the frequency analysis.

11. The vortex flowmeter of claim 10, wherein the first and the second amplifiers comprise charge amplifiers.

12. The vortex flowmeter of claim 10, wherein the first and the second amplifiers comprise voltage amplifiers.

13. A vortex flowmeter, comprising:
a flow tube configured to receive a flow of process fluid in a first direction;
a bluff body disposed within the flow tube configured to generate vortices in the flow of process fluid;
a plurality of piezoelectric cables disposed within the bluff body configured to detect deformations within the bluff body resulting from the vortices acting on the bluff body the plurality of piezoelectric cables comprising:
a first piezoelectric cable disposed within a first hole in the bluff body proximate a first side of the bluff body, the first piezoelectric cable configured to detect deformations within the bluff body resulting from vortices acting on the first side of the bluff body and generate a first sensor indicative of the detected deformations within the bluff body resulting from vortices acting on the first side of the bluff body; and
a second piezoelectric cable disposed within a second hole in the bluff body proximate a second side of the bluff body, the second piezoelectric cable configured to detect deformations within the bluff body resulting from vortices acting on the second side of the bluff body and generate a second sensor signal indicative of the detected deformations within the bluff body resulting from vortices acting on the second side of the bluff body; and
flowmeter electronics coupled to the plurality of piezoelectric cables configured to receive the sensor signals from the plurality of piezoelectric: cables and generate a process fluid flow output based on the received signals, the flowmeter electronics comprising:
a first amplifier configured to receive the first sensor signal and provide a first amplified output based on the first sensor signal;
a second amplifier configured to receive the second sensor s and provide a second amplified output based on the second sensor signal;
an inverter configured to receive die second amplified output and generate an inverted output based on the second amplified output; and
a signal adder configured to receive the first amplified output and the inverted output and provide an adder output based on the first amplified output and the inverted output.

14. The vortex flowmeter of claim 13, wherein the plurality of piezoelectric cables are disposed within holes on opposite sides of the bluff body relative to a direction transverse to the first direction of the flow of process fluid.

15. The vortex flowmeter of claim 14, wherein the each of the first and second piezoelectric cables is encapsulated by a sealing material.

* * * * *